United States Patent
Kim et al.

(10) Patent No.: US 9,556,815 B2
(45) Date of Patent: Jan. 31, 2017

(54) METHOD FOR DIAGNOSING FAILURE OF FUEL PRESSURE SENSOR FOR HIGH-PRESSURE PUMP OF GDI ENGINE

(71) Applicant: HYUNDAI MOTOR COMPANY, Seoul (KR)

(72) Inventors: Hee Sup Kim, Hwaseong-si (KR); Jong Sung Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 14/689,826

(22) Filed: Apr. 17, 2015

(65) Prior Publication Data
US 2016/0153381 A1  Jun. 2, 2016

(30) Foreign Application Priority Data
Dec. 2, 2014 (KR) .................... 10-2014-0170360

(51) Int. Cl.
*F02D 41/22* (2006.01)
*F02D 41/38* (2006.01)

(52) U.S. Cl.
CPC ......... *F02D 41/222* (2013.01); *F02D 41/3809* (2013.01); *F02D 2041/223* (2013.01); *F02D 2041/227* (2013.01); *F02D 2041/228* (2013.01); *F02D 2200/0602* (2013.01)

(58) Field of Classification Search
CPC .............. F02D 2041/223; F02D 41/222; F02D 41/3809; F02D 2041/227; F02D 2041/228; F02D 2200/0602; F02D 41/3836
See application file for complete search history.

(56) References Cited

U.S. PATENT DOCUMENTS

| | | | |
|---|---|---|---|
| 6,032,639 A * | 3/2000 | Goto ..................... | F02D 41/222 123/295 |
| 6,971,368 B2 * | 12/2005 | Uchiyama ............. | F02D 41/221 123/359 |
| 2011/0022290 A1 * | 1/2011 | Kaneko ................. | F02D 41/222 701/103 |

(Continued)

FOREIGN PATENT DOCUMENTS

KR  10-2002-0030453 A  4/2002
KR  10-2003-0055552 A  7/2003

(Continued)

OTHER PUBLICATIONS

Korean Office Action issued in Application No. 10-2014-0170360 dated Jan. 25, 2016.

*Primary Examiner* — Sizo Vilakazi
(74) *Attorney, Agent, or Firm* — McDermott Will & Emery LLP

(57) ABSTRACT

A method for diagnosing a failure of a fuel pressure sensor for a high-pressure pump of a GDI engine includes a data collection step of collecting information on a state of a vehicle. A sensor condition determination step determines whether data collected in the data collection step meets conditions for determining the failure of the fuel pressure sensor. A failure determination step determines whether the fuel pressure value of the pressure sensor for the high-pressure pump is greater than or equal to a first reference value, and simultaneously, whether a fuel amount learning value is greater than or equal to a second reference value.

12 Claims, 3 Drawing Sheets

(56) References Cited

U.S. PATENT DOCUMENTS

2012/0095669 A1* 4/2012 Katsurahara .......... F02D 41/221
 701/107
2013/0080032 A1* 3/2013 Kaneko ................. G01L 27/007
 701/103

FOREIGN PATENT DOCUMENTS

| KR | 10-2007-0019909 A | 2/2007 |
| KR | 10-0773690 B1 | 11/2007 |
| KR | 10-2011-0054469 A | 5/2011 |
| KR | 10-2013-0056936 A | 5/2013 |

\* cited by examiner

METHOD FOR DIAGNOSING FAILURE OF FUEL PRESSURE SENSOR FOR HIGH-PRESSURE PUMP OF GDI ENGINE

CROSS-REFERENCE(S) TO RELATED APPLICATION

The present application claims the benefit of priority to Korean Patent Application Number 10-2014-0170360 filed on Dec. 2, 2014, the entire content of which application is incorporated herein for all purposes by this reference.

TECHNICAL FIELD

The present disclosure relates to a gasoline direct injection (GDI), and more particularly, to a method for accurately diagnosing a failure of a fuel pressure sensor for a high-pressure pump of a GDI engine.

BACKGROUND

Gasoline engines are classified into a port fuel injection (PFI) engine for injecting fuel to a front end of an intake value so that the fuel can enter a combustion chamber, and a gasoline direct injection (GDI) engine for injecting fuel directly to an inside of a combustion chamber.

FIG. 1 is a view showing a conventional method for diagnosing a failure of a fuel pressure sensor for a high-pressure pump of a GDI engine. In the conventional method, a controller checks whether or not a failure occurs in a fuel system on the basis of a temperature of cooling water, an engine RPM, a pressure of a fuel rail, a runtime of the engine, and data on a state of the engine. When identifying a failure in the engine system, the controller turns on a check engine warning lamp and controls the vehicle to be driven in a limp-home mode.

Without an accurate determination about which part in the fuel system is in failure, it is determined that all the fuel system is in failure, and the vehicle is driven in a limp-home mode, which causes user dissatisfaction.

Therefore, it is required to develop a method for diagnosing a failure of a fuel pressure sensor for a high-pressure pump of a GDI engine, which can provide an improved discrimination between a normal product and a malfunctioning product under various driving conditions upon diagnosing a drift failure of the fuel pressure sensor when a problem occurs in the fuel pressure sensor.

The information disclosed in this Background section is only for enhancement of understanding of the general background of the disclosure and should not be taken as an acknowledgement or any form of suggestion that this information forms the prior art already known to a person skilled in the art.

SUMMARY

The present disclosure is directed to a method for diagnosing a failure of a fuel pressure sensor for a high-pressure pump of a GDI engine, which can provide an improved discrimination between a normal product and a malfunctioning product under various driving conditions when diagnosing the drift failure of the pressure sensor for the high-pressure pump.

Other objects and advantages of the present disclosure can be understood by the following description, and become apparent with reference to the embodiments of the present inventive concept. It is obvious to those skilled in the art to which the present disclosure pertains that the objects and advantages of the present disclosure can be realized by the means as claimed and combinations thereof.

In accordance with an embodiment of the present inventive concept, a method for diagnosing a failure of a fuel pressure sensor for a high-pressure pump of a GDI engine includes collecting information on a state of a vehicle. Whether or not data collected in the step of collecting the information meets a condition for determining the failure of the fuel pressure sensor is determined. Whether a fuel pressure value of the fuel pressure sensor for the high-pressure pump is greater than or equal to a first reference value, and simultaneously, whether a fuel amount learning value is greater than or equal to a second reference value are determined in the step of determining whether the data collected in the collecting information meets the condition.

The method may further include determining, in the step of determining whether the fuel pressure value of the fuel pressure sensor for the high-pressure pump is greater than or equal to the first reference value and whether the fuel amount learning value is greater than or equal to the second reference value, whether the fuel pressure sensor for the high-pressure pump is in a positive drift failure when the fuel pressure value of the pressure sensor for the high-pressure pump is greater than or equal to the first reference value, and simultaneously, when the fuel amount learning value is greater than or equal to the second reference value.

The method may further include confirming, in the step of determining whether the fuel pressure value of the fuel pressure sensor for the high-pressure pump is greater than or equal to the first reference value and whether the fuel amount learning value is greater than or equal to the second reference value, whether the fuel pressure sensor for the high-pressure pump is normal when the fuel pressure value of the pressure sensor for the high-pressure pump is less than the first reference value, and simultaneously, when the fuel amount learning value is less than the second reference value.

The method may further include determining whether the engine is on after the steps of determining and confirming whether the fuel pressure sensor for the high-pressure pump is normal.

The method may further include determining whether the engine is running when it is determined that the engine is on The method may further include initializing measuring revolutions per minute of the engine when it is determined that the engine is running.

The method may further include increasing the engine RPM when it is determined that the engine is not running.

The method may further include terminating a control when it is determined that the engine is not running.

The method may further include, before the step of determining whether the fuel pressure sensor for the high-pressure pump is normal, storing the fuel pressure value of the fuel pressure sensor for the high-pressure pump at a predetermined time after the engine is on.

The method may further include, after the step of storing the fuel pressure value of the fuel pressure sensor, determining that the fuel pressure sensor for the high-pressure pump is in a negative drift failure when the fuel pressure value is less than the first reference value, and simultaneously, when the fuel amount learning value is less than the second reference value.

The method may further include, after the step of storing the fuel pressure value of the fuel pressure sensor, determining that the fuel pressure sensor for the high-pressure pump is normal when the fuel pressure value is greater than or equal to the first reference value, and simultaneously, when the fuel amount learning value is greater than or equal to the second reference value.

According to the method as described above, for diagnosing a failure of a fuel pressure sensor for a high-pressure pump of a GDI engine, more various conditions than in the prior art are added for the case wherein the pressure sensor for the high-pressure pump fails in a positive or negative direction, so that more accurate failure diagnosis can be achieved under various driving conditions. In addition, since the failure is more specifically and accurately examined than in the prior art, an engine after service can be prevented.

Especially, since whether both the primary fail condition on the basis of the pressure of fuel and the secondary fail condition on a fuel amount learning value are satisfied is checked, more accurate and reliable failure diagnosis can be achieved.

DETAILED DESCRIPTION

Figure 1:
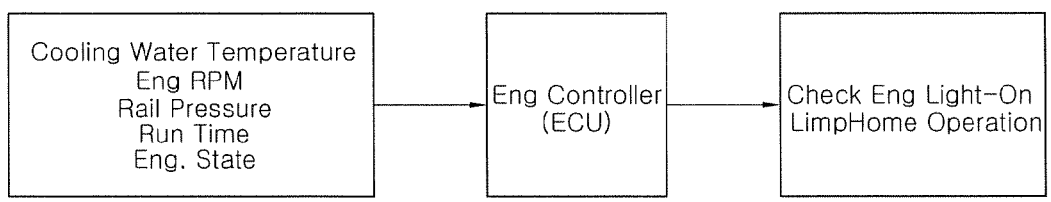
FIG. 1 is a view showing the configuration of a conventional method for diagnosing a failure of a fuel pressure sensor for a high-pressure pump of a GDI engine.

A method for diagnosing a failure of a fuel pressure sensor for a high-pressure pump of a GDI engine according to exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept.

Figure 2:
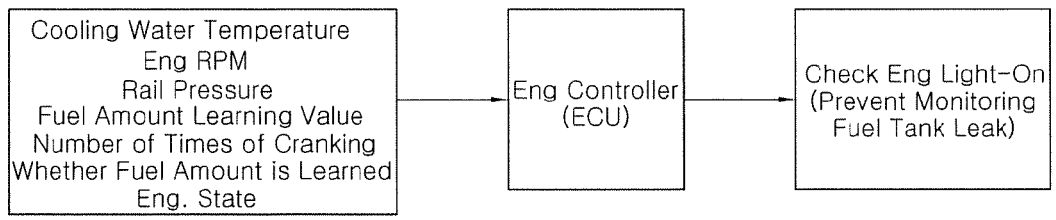
FIG. 2 is a view showing the configuration of a method for diagnosing a failure of a fuel pressure sensor for a high-pressure pump of a GDI engine in accordance with an embodiment of the present inventive concept.
Figure 3:
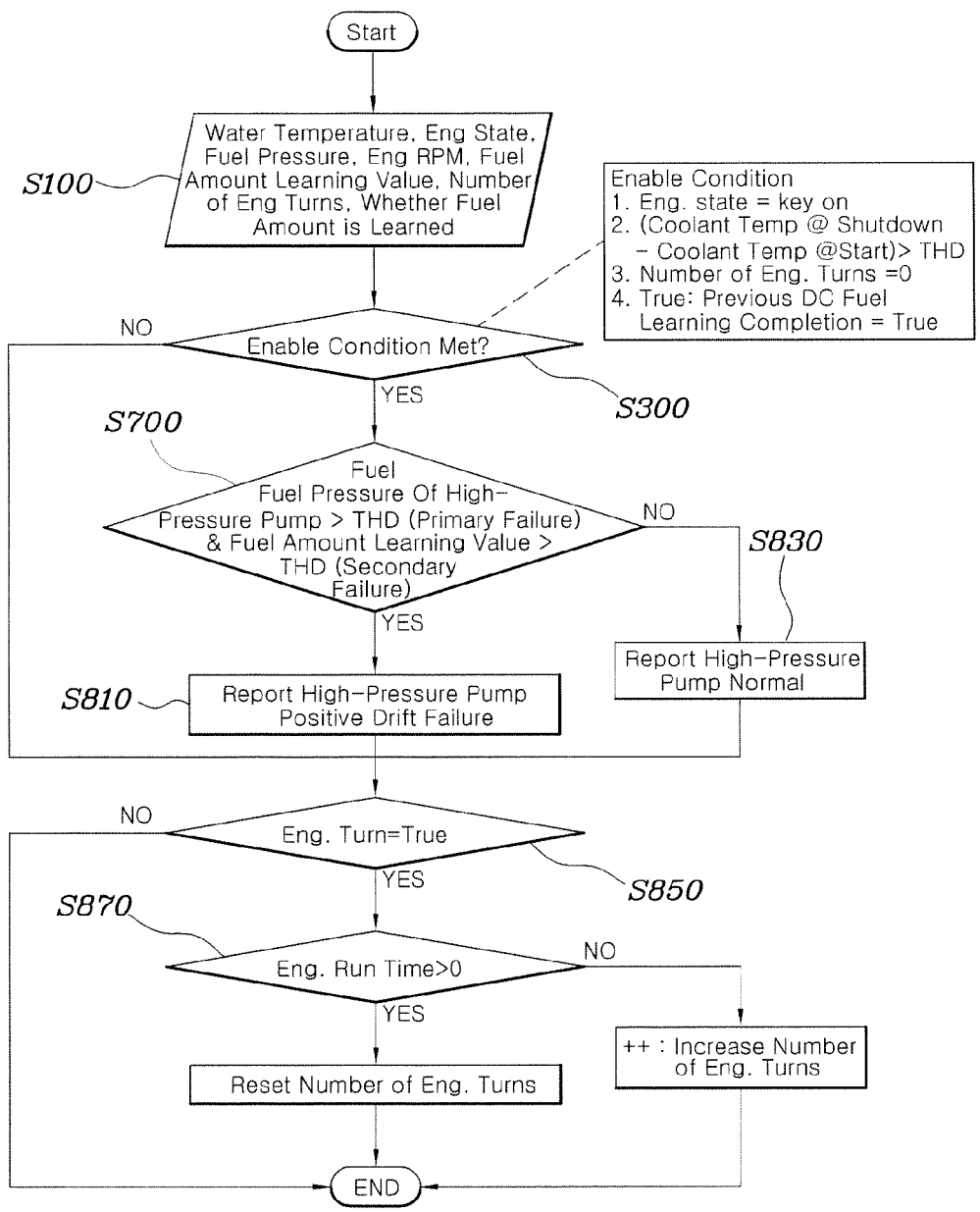
FIG. 3 is a flowchart showing a procedure of diagnosing a positive drift failure of FIG. 2.
Figure 4:
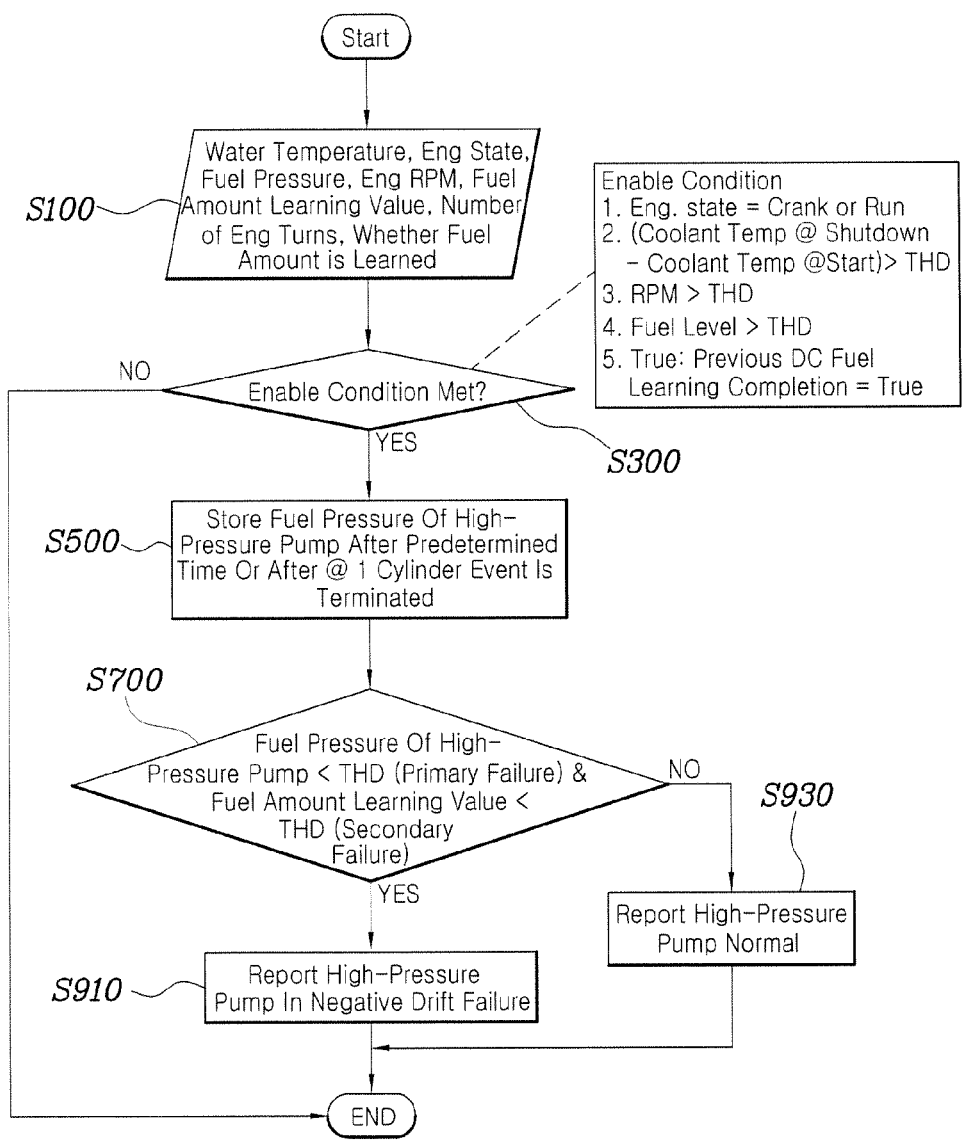
FIG. 4 is a flowchart showing a procedure of diagnosing a negative drift failure of FIG. 2.

FIG. 2 is a view showing the configuration of a method for diagnosing a failure of a fuel pressure sensor for a high-pressure pump of a GDI engine in accordance with an embodiment of the present inventive concept, FIG. 3 is a flowchart showing a procedure of diagnosing a positive drift failure of FIG. 2, and FIG. 4 is a flowchart showing a procedure of diagnosing a negative drift failure of FIG. 2. In FIGS. 3 and 4, each of THD denotes threshold value.

The conventional method for diagnosing a drift failure of a fuel pressure sensor for a high-pressure pump of a GDI engine is not robust in failure diagnosis discrimination between a normal product and a malfunctioning product. Therefore, in order to solve such a problem, provided is a method for diagnosing a failure of a fuel pressure sensor for a high-pressure pump of a GDI engine, which is more robust than the conventional method in diagnosing a failure of the fuel pressure sensor for the high-pressure pump by using additional entry conditions, including a fuel amount learning value, whether or not fuel amount is learned, the number of times of cranking (wherein the number of times of cranking is reset when it is determined that an engine has been run), and the like.

Particularly, according to the present disclosure, on determining positive and negative fail conditions, a failure diagnosis is completed only when a primary fail condition of a pressure condition and a secondary fail condition of a fuel amount learning value condition are both satisfied, thereby enabling a more robust failure diagnosis.

Therefore, in accordance with an embodiment of the present inventive concept, as shown in FIG. 3, a method for diagnosing a failure of a fuel pressure sensor for a high-pressure pump of a GDI engine includes a data collection step (S100) of collecting information on a state of a vehicle. A sensor condition determination step (S300) determines whether the data collected in the data collection step (S100) meets conditions with which a determination of a failure of the sensor can be made. A failure determination step (S700) determines, in the sensor condition determination step (S300), whether the fuel pressure value of the pressure sensor for the high-pressure pump is greater than or equal to a first reference value, and simultaneously, whether a fuel amount learning value is greater than or equal to a second reference value.

According to the present disclosure, a failure of a pressure sensor for a high-pressure pump is divided into a positive drift failure and a negative drift failure, and a control method for determining whether or not a failure occurs with respect to the respect cases will be described.

First, in the data collection step (S100), information on the state of the vehicle is collected, wherein data collected in the data collection step (S100) may include water temperature, a state of the engine, fuel pressure, an engine RPM, a fuel amount learning value, the number of turns of the engine, whether or not a fuel amount is learned, and the like.

Then, the sensor condition determination step (S300) determines whether the data collected in the data collection step (S100) meets conditions with which a determination of a failure of the sensor can be made. In the sensor condition determination step (S300), mutually different conditions are inputted when a determination of the positive drift failure is performed and when a determination of the negative drift failure is performed. Therefore, the respective cases will be separately described.

First, in the case of determining the positive drift failure, when the engine is in a key-on state, when a value obtained by subtracting a temperature value of cooling water upon starting from a temperature value of the cooling water upon a previous turning-off of the engine is larger than a reference value pre-stored in a controller, when there is no cranking history from the previous turning-off of the engine to the key-on state (i.e. when the number of turns of the engine is zero) (primary fail condition), and when a fuel learning of a pervious driving cycle has been completed and determined to be normal (secondary fail condition), the positive drift failure of the pressure sensor for the high-pressure pump can be diagnosed.

Therefore, when the condition, as described above, with which a determination of a failure of the sensor can be made are met, the failure determination step (S700) determines whether a fuel pressure value of the pressure sensor for the high-pressure pump is greater than or equal to the first reference value, and simultaneously, whether a fuel amount learning value is greater than or equal to the second reference value. That is, it is determined whether the primary fail condition of a pressure condition and the secondary fail condition of the fuel amount learning value are both satisfied.

When the fuel pressure value of the pressure sensor for the high-pressure pump is greater than or equal to the first reference value, and simultaneously, when the fuel amount learning value is greater than or equal to the second reference value in the failure determination step (S700), a positive failure confirmation step (S810) determines whether the pressure sensor for the high-pressure pump is in positive drift failure. In contrast, when the fuel pressure value of the pressure sensor for the high-pressure pump is less than the first reference value, and simultaneously, when the fuel amount learning value is less than the second reference value in the failure determination step (S700), a positive normality confirmation step (S830) confirms whether the pressure sensor for the high-pressure pump is normal.

After performing the failure determination step (S700) and confirming whether or not the pressure sensor for the high-pressure pump is in failure, as described above, an engine turn determination step (S850) determines whether or not the engine is on. In addition, when the conditions with which a determination of a failure of the sensor can be made are not met in the sensor condition determination step (S300), the controller does not determine whether the pressure sensor for the high-pressure pump is in failure, and directly performs the engine turn determination step.

When it is determined that the engine is on in the engine turn determination step (S850), an engine run determination step (S870) determines whether the engine has been run. When it is determined that the engine is running, the number of turns of the engine is initialized, and the control is terminated. In contrast, when it is determined that the engine has not been run in the engine run determination step (S870), the number of turns of the engine increases, and the control is terminated.

If it is determined that the engine has not been turned in the engine turn determination step (S850), the controller terminates the control thereof. Accordingly, by the control method as described above, the controller determines whether or not the pressure sensor for the high-pressure pump for the GDI engine is in positive drift failure.

Therefore, when the temperature of cooling water and a cranking history are checked, and a pressure upon key-on exceeds a reference value, the primary fail condition is satisfied and if the engine is determined to have been run upon starting, the cranking history is deleted. The reason why the control method of determining the primary fail condition on the basis of a pressure value is used is that a fuel pressure release (i.e. Bleed Down) tendency under a condition in which an engine is not sufficiently warmed up is different from a fuel pressure release tendency after warming up, so that the pressure of fuel is hardly released and is kept in the case of a system having a relatively superior confidentiality.

When a learning value exceeds a reference value in a state in which fuel amount learning is completed after the primary fail condition has been satisfied, it is determined whether the secondary fail condition is satisfied. Therefore, when the primary fail condition and the secondary fail condition are both satisfied, the pressure sensor for the high-pressure pump is determined to be in failure, final reporting is performed, and a notification is sent to the user by a method, such as a warning.

The reason why the secondary fail condition is used is that the amount of fuel may vary depending on the pressure of the fuel in a GDI engine. The amount of fuel which is finally calculated and injected into a combustion chamber is determined by the pressure of fuel and an injection period of time (i.e. INJ Operation Duration=f (a target mount of fuel, a pressure of fuel).

Therefore, as the pressure of fuel is lower or higher than an actual pressure, the amount of fuel actually injected into a combustion chamber decreases or increases. According to such an injection characteristic, when a positive failure of expressing a pressure higher than an actual fuel pressure occurs, the amount of fuel actually injected is not sufficient, so that fuel gas is rarefied, and a tendency to increase the fuel amount learning value appears. Thus, according to this feature, the positive drift failure determination is performed.

Similarly, referring to FIG. 4, in a method for determining a negative drift failure, the controller performs a data collection step (S100) of collecting information on the state of the vehicle. Data collected in the data collection step (S100) may include water temperature, a state of the engine, pressure of fuel, an engine RPM, a fuel amount learning value, the number of turns of the engine, whether or not a fuel amount is learned, and the like.

Then, the sensor condition determination step (S300) determines whether the data collected in the data collection step (S100) meets a condition with which determination of a failure of the sensor can be made.

In the case of determining the negative failure, the pressure of fuel is measured either after a predetermined cranking time (for completion of one cylinder event) in a state in which the system has been sufficiently stabilized or at a predetermined time after cranking, and it is determined whether the measured fuel pressure exceeds a reference value.

In the sensor condition determination step (S300), when a negative drift failure is determined, conditions with which the failure of the sensor can be determined are whether the engine is in a crank state or in a run state, whether a value obtained by subtracting the temperature value of cooling water upon starting from the temperature value of the cooling water upon a previous turning-off of the engine is larger than a reference value pre-stored in the controller, whether the RPM is larger than a reference value, whether the level of fuel is higher than a reference value, and whether the fuel learning of a pervious driving cycle has been completed and determined to be normal. When the conditions are determined to be satisfied, a negative drift failure of the pressure sensor for the high-pressure pump can be diagnosed.

In the case of performing a negative drift failure determination of the pressure sensor for the high-pressure pump, after the sensor condition determination step (S300) is performed as described above, a fuel pressure value storage step (S500) of storing a fuel pressure value of the fuel pressure sensor for the high-pressure pump at a predetermined time after the engine is turned is performed before the failure determination step (S700) is performed. Therefore, upon cranking of the engine, the pressure of fuel is checked and set as a reference value in an asynchronous control state before a crank angle sensor and a cam angle sensor are synchronized with each other. Here, in order not to perform a diagnosis when the RPM of the vehicle is too low, but to perform a diagnosis only at a predetermined RPM or higher, a reference for determining failure of the pressure sensor is set with respect to time. Therefore, when the pressure of fuel does not exceed the reference value, a primary fail condition is satisfied.

After the fuel pressure storage step (S500) is performed, the failure determination step (S700) is performed. Upon performing the failure determination step (S700), when the fuel pressure value is less than a first reference value, and simultaneously, when the fuel amount learning value is less than a second reference value, a negative failure confirmation step (S910) of determining that the pressure sensor for the high-pressure pump is in negative drift failure is performed, and then the control is terminated. In contrast, upon performing the failure determination step (S700), when the fuel pressure value is greater than or equal to the first reference value, and simultaneously, when the fuel amount learning value is greater than or equal to the second reference value, a negative normality confirmation step (S930) of confirming that the pressure sensor for the high-pressure pump is normal is performed, and then the control is terminated.

Even when the negative failure conditions are determined, the primary fail condition on a fuel pressure is determined, the secondary fail condition on the fuel amount learning value is determined, and the pressure sensor is determined to be in negative drift failure when the primary fail condition and the secondary fail condition are both satisfied.

In the prior art, upon starting, a failure counter increases due to deviation (in the position of a cam) in asynchronous control (i.e. in an asynchronization spill mode) of a high-pressure pump, even in normal products. In contrast, according to the present disclosure, it is possible to enhance discrimination between a normal product and a malfunctioning product using a fuel pressure value, which is measured either after a predetermined cranking time (for completion of one cylinder event) in an asynchronous mode or at a predetermined time after cranking.

Accordingly, according to the method of the present disclosure as described above, for diagnosing a failure of a fuel pressure sensor for a high-pressure pump of a GDI engine, more various conditions than in the prior art are added for the case wherein the pressure sensor for the high-pressure pump fails in a positive or negative direction, so that a relatively superior failure diagnosis can be achieved under various driving conditions. In addition, since a failure is more specifically and accurately examined than in the prior art, a quality matter can be improved, and damage to the engine can be prevented.

Especially, since whether both the primary fail condition on the basis of the pressure of fuel and the secondary fail condition on a fuel amount learning value are satisfied is checked, a relatively superior failure diagnosis can be achieved.

While the present inventive concept has been described with respect to the specific embodiments, it will be apparent to those skilled in the art that various changes and modifications may be made without departing from the spirit and scope of the disclosure as defined in the following claims.

What is claimed is:

1. A method for diagnosing a failure of a fuel pressure sensor for a high-pressure pump of a gasoline direct injection (GDI) engine, the method comprising steps of:
   collecting information on a state of a vehicle;
   determining whether data collected in the step of collecting information satisfies a condition for determining the failure of the fuel pressure sensor; and
   determining, in the step of determining whether the data collected in the step of collecting information satisfies the condition, whether a fuel pressure value of the fuel pressure sensor for the high-pressure pump is greater than or equal to a first reference value, and simultaneously, whether a fuel amount learning value is greater than or equal to a second reference value.

2. The method of claim 1, further comprising determining, in the step of determining whether the fuel pressure value of the fuel pressure sensor for the high-pressure pump is greater than or equal to the first reference value and whether the fuel amount learning value is greater than or equal to the second reference value, whether the fuel pressure sensor for the high-pressure pump is in a positive drift failure when the fuel pressure value of the pressure sensor for the high-pressure pump is greater than or equal to the first reference value, and simultaneously, when the fuel amount learning value is greater than or equal to the second reference value.

3. The method of claim 1, further comprising confirming, in the step of determining whether the fuel pressure value of the fuel pressure sensor for the high-pressure pump is greater than or equal to the first reference value and whether the fuel amount learning value is greater than or equal to the second reference value, whether the fuel pressure sensor for the high-pressure pump is normal when the fuel pressure value of the pressure sensor for the high-pressure pump is less than the first reference value, and simultaneously, when the fuel amount learning value is less than the second reference value.

4. The method of claim 3, further comprising determining whether the engine is on after the step of determining that the fuel pressure sensor for the high-pressure pump is in the positive drift failure and the step of confirming that the fuel pressure sensor for the high-pressure pump is normal.

5. The method of claim 4, further comprising determining whether the engine is running when it is determined that the engine is on.

6. The method of claim 5, further comprising initializing measuring revolutions per minute (RPM) of the engine when it is determined that the engine is running in the step of determining whether the engine is running.

7. The method of claim 5, further comprising increasing the engine RPM when it is determined that the engine is not running in the step of determining whether the engine is running.

8. The method of claim 4, further comprising terminating a control when it is determined that the engine is not on in the step of determining whether the engine is on.

9. The method of claim 1, further comprising, storing, before the step of determining whether the fuel pressure sensor for the high-pressure pump is in failure, the fuel pressure value of the fuel pressure sensor for the high-pressure pump at a predetermined time after the engine is on.

10. The method of claim 9, further comprising, determining, after the step of storing the fuel pressure value of the fuel pressure sensor, whether the fuel pressure sensor for the high-pressure pump is in a negative drift failure when the fuel pressure value is less than the first reference value, and simultaneously, when the fuel amount learning value is less than the second reference value.

11. The method of claim 9, further comprising, determining, after the step of storing the fuel pressure value of the fuel pressure sensor, whether the fuel pressure sensor for the high-pressure pump is normal when the fuel pressure value is greater than or equal to the first reference value, and simultaneously, when the fuel amount learning value is greater than or equal to the second reference value.

12. A non-transitory computer-readable recording medium comprising computer executable instructions execution of which causes a controller to perform the method according to claim 1.

* * * * *